US006883917B2

(12) United States Patent
Wichner et al.

(10) Patent No.: US 6,883,917 B2
(45) Date of Patent: Apr. 26, 2005

(54) ILLUMINATION FIELD BLENDING FOR USE IN SUBTITLE PROJECTION SYSTEMS

(75) Inventors: Brian D. Wichner, Otter Rock, OR (US); Mark Peterson, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 10/733,972

(22) Filed: Dec. 11, 2003

(65) Prior Publication Data

US 2004/0119953 A1 Jun. 24, 2004

Related U.S. Application Data

(63) Continuation of application No. 10/020,516, filed on Dec. 14, 2001, now Pat. No. 6,663,244.

(51) Int. Cl.$^{7}$ ........................ G03B 21/14; G03B 21/26; G03B 21/20; G03B 3/00

(52) U.S. Cl. ............................ 353/30; 353/20; 353/94; 353/102; 353/121; 353/122; 352/47; 352/55; 352/90; 348/744

(58) Field of Search .............................. 353/20, 30, 94, 353/101, 102, 121, 122; 352/4, 40, 47, 55, 90; 348/744

(56) References Cited

U.S. PATENT DOCUMENTS

| | | | | |
|---|---|---|---|---|
| 5,828,410 A | | 10/1998 | Drapeau | 348/383 |
| 5,959,717 A | * | 9/1999 | Chaum | 352/40 |
| 6,663,244 B1 | * | 12/2003 | Wichner et al. | 353/122 |
| 2004/0027539 A1 | * | 2/2004 | Plunkett | 352/90 |

FOREIGN PATENT DOCUMENTS

| | | | |
|---|---|---|---|
| EP | 0 987 899 A2 | 2/2000 | H04N/7/50 |

OTHER PUBLICATIONS

Yamauchi et al, XP0106196.
Dery, XP0154133.
McArthur et al, XP0007143.

* cited by examiner

*Primary Examiner*—Judy Nguyen
*Assistant Examiner*—Melissa J Koval
(74) *Attorney, Agent, or Firm*—Schwabe, Williamson & Wyatt, P.C.

(57) ABSTRACT

A projection system that projects a text or subtitle box onto an image minimizes the contrast between the text box and the image. A transition region surrounding the text box minimizes visual disruption to the image onto which the text box is projected. The positions of optical elements of a text projector enable the text box to gradually fade out. The text projector has a lamp that defines an object plane and a light path modifier. The light path modifier is offset from the object plane, toward the lamp to blend the borders of the text box into the image projected by an image projector.

6 Claims, 4 Drawing Sheets

ILLUMINATION FIELD BLENDING FOR USE IN SUBTITLE PROJECTION SYSTEMS

RELATED APPLICATION

This application is a continuation of U.S. application Ser. No. 10/020,516 filed on Dec. 14, 2001 now U.S. Pat. No. 6,663,244, entitled "Illumination Field Blending for Use in Subtitle Projection Systems."

TECHNICAL FIELD

This invention relates to image projection systems that superimpose text onto a screen with an image of a projected film.

BACKGROUND OF THE INVENTION

Subtitles or text images that are projected onto a screen from a film having a movie or other image are commonly laser etched into the film itself. Subtitles etched onto film can be difficult to see, particularly if at any time the images in the film have a color that matches the color of the subtitles. The film image can temporarily camouflage the subtitles. In addition, because the subtitles are etched onto the film itself, a unique and separate film must be made having subtitles in each desired language.

To make subtitles more visible and to avoid the need to alter the film itself, a projection system which projects one image onto another image may be used to project subtitles onto another image on a screen. Such a projection system has a first projector that projects the movie or other images onto a screen and a second projector that projects a text box containing subtitles onto the screen. The second projector, instead of projecting subtitles that have been etched onto film, may project digital images from a compact disc. These digital images are clearer than text that has been etched onto film. In addition, a compact disc may have the subtitles in a variety of languages, making international distribution of movies simpler because the film can be distributed in its original form.

A disadvantage of using such a text projection system is that the text box sharply transitions from light to dark, making the border of the subtitle image sharp and clearly visible on the image. This sharp transition creates a sharply distinct box on the image, cutting out whatever portion of the image that would otherwise be seen where the box is located. Such a text box prevents the image from gradually blending into the text.

SUMMARY OF THE INVENTION

It is an object of this invention to provide a projector that projects a text box with a fade out transition region to enable a text box to appear to gradually fade out into the other image.

The projection system of the present invention projects a text box with a fade out transition region that minimizes visual disruption to the image onto which the text box is projected. The fade out transition region is created by the position of the optical elements of a text projector, as discussed below. The projection system includes an image projector and a text projector. The image projector projects an image onto a screen, and the text projector projects text or subtitles onto a portion of the image. The text or subtitles are projected in a text box.

The text projector has a light source or lamp adapted to project light as a text box. The text projector also has a light path modifier positioned to receive light from the light source. In one embodiment, the light path modifier is an integrator tunnel with reflective walls. In another embodiment, the light path modifier is a pair of fly eye panels. The text projector further includes a relay lens that transmits light in the form of a text box from the light path modifier to a display device. The display device may be transmissive or reflective. A projection lens receives light from the display device and is positioned to project a text box onto the image projected by the image projector. The text projector preferably has an optional pair of condensing lenses positioned to condense light and direct it from the light path modifier to the relay lens. A single condensing lens may also be used. Alternatively, the relay lens may function as the condensing lens.

The sharpness of the borders of the text box are determined by the placement of the light path modifier relative to an object plane. The position of the object plane is defined by the position of the relay lens. Projectors which project a sharply defined text box onto another image have a relay lens that defines an object plane at the exit end of a light tunnel or other light path modifier. In order to decrease the sharpness of the borders of the text box, the exit end of the light path modifier is sufficiently offset from the object plane so that the contrast between the text box and the image projected by the image projector is diminished. The light path modifier may also be sufficiently offset so that the image projected by the image projector is at least partially visible through the text box and so that the text box has a fade out transition region. The borders of such a text box will blend into the image projected by the image projector.

DETAILED DESCRIPTION OF PREFERRED EMBODIMENTS

Different embodiments of the present invention, described by way of example, project an image and a text box, the text box having borders that enable the image to be seen along the borders. Skilled persons will readily appreciate that the present invention can be used in any projection system that projects one image onto another.

Figure 1:
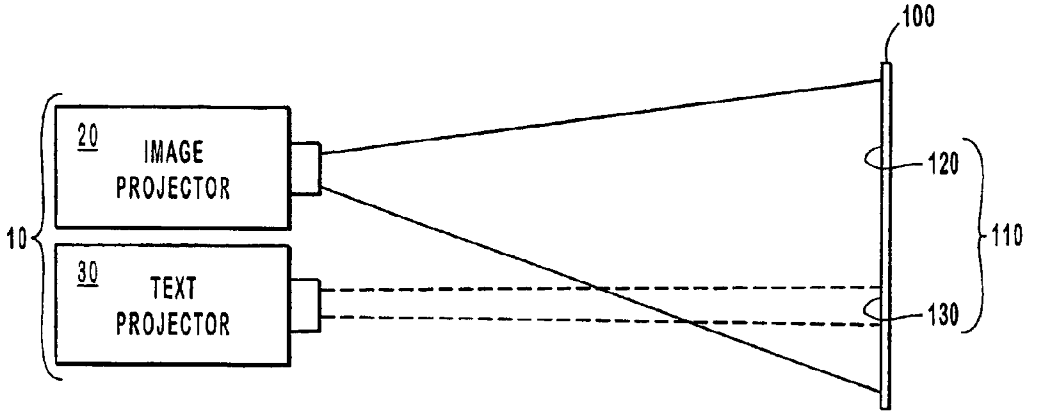
FIG. 1 is a schematic of the projection system with an image projector and a text projector projecting onto a screen.

One embodiment of a projection system 10 is shown in FIG. 1, with an image projector 20 and a text projector 30. Image projector 20 projects an image 120 onto a screen 100 and text projector 30 projects a smaller image, as text 132 in a text box 130, onto the screen 100. Together, text box 130 and image 120 form a composite image 110.

Figure 2A:
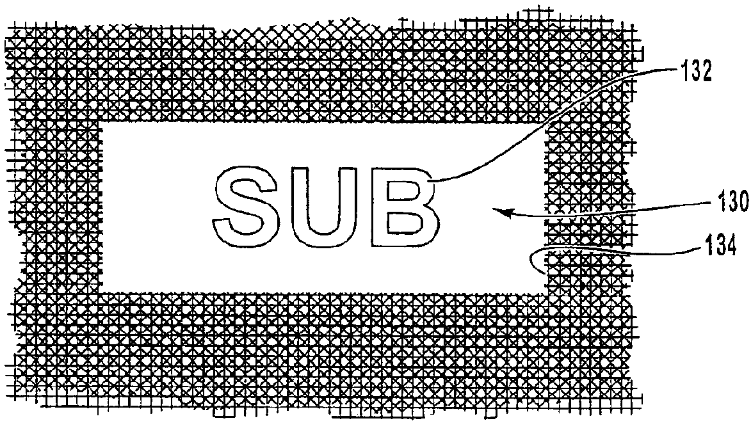
FIG. 2A illustrates a first example of a text box projected onto another image as it would appear on a screen when a prior art system is utilized.
Figure 3A:
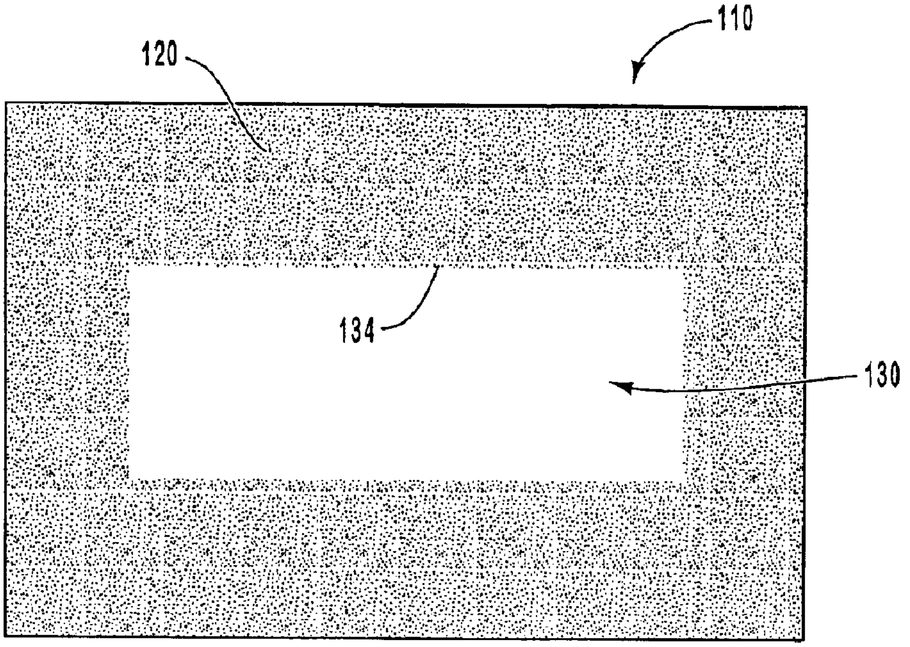
FIG. 3A illustrates a second example of a text box projected onto another image as it would appear on a screen when a prior art system is utilized.

FIGS. 2A and 3A illustrate text boxes 130 projected by a text projector 30 of the prior art as the text boxes 130 would appear in composite image 110. Text boxes 130 of the prior art have borders 134 that are sharply defined, making text box 130 distinct from image 120. The sharp definition of border 134 completely blocks out precisely as much of image 120 as overlaps text box 130. Text boxes 130 of the prior art also prevent image 120 from gradually blending into text 132.

Figure 2B:
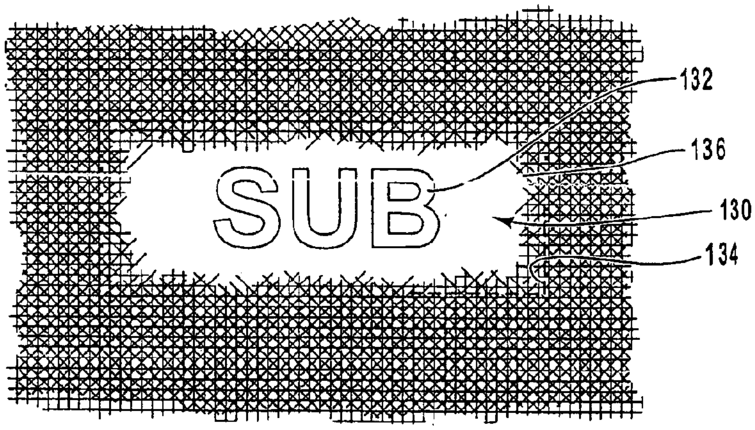
FIG. 2B illustrates a first example of a text box projected onto another image as it would appear on a screen when a system is used in accordance with the present invention.
Figure 3B:
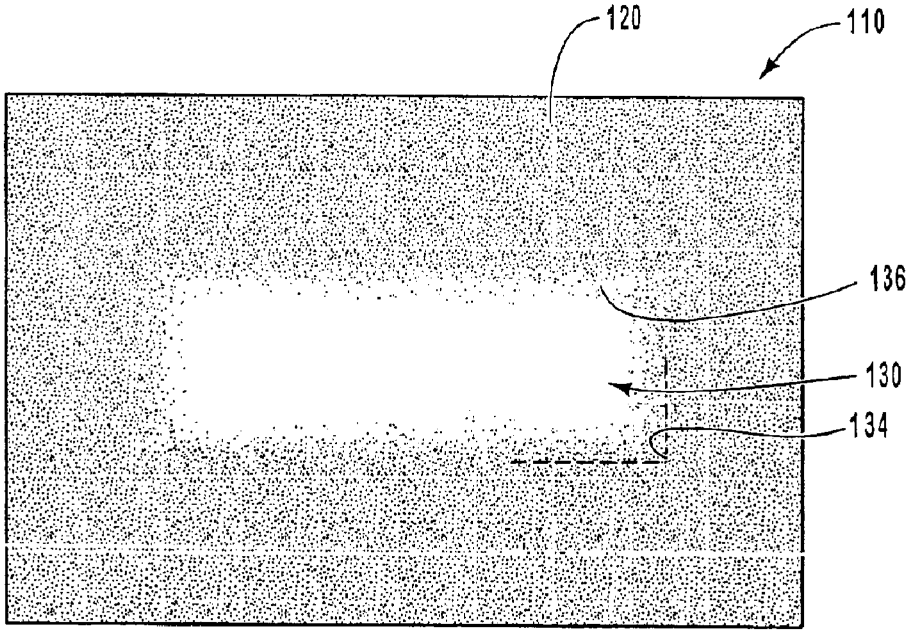
FIG. 3B illustrates a second example of a text box projected onto another image as it would appear on a screen when a system is utilized in accordance with the present invention.

FIGS. 2B and 3B illustrate the appearance of text boxes 130 when light is transmitted onto a screen through use of an embodiment of the present invention. Text boxes 130 of FIGS. 2B and 3B have a fade out transition region 136 that gradually fades out completely at border 134 of text box 130, enabling more of image 120 to be viewed than text boxes 130 delivered in accordance with the prior art, as shown in FIGS. 2A and 3A. Fade out transition region 136 enables text box 130 to blend with image 120, making text box 130 less visually disruptive to composite image 110.

Figure 4A:
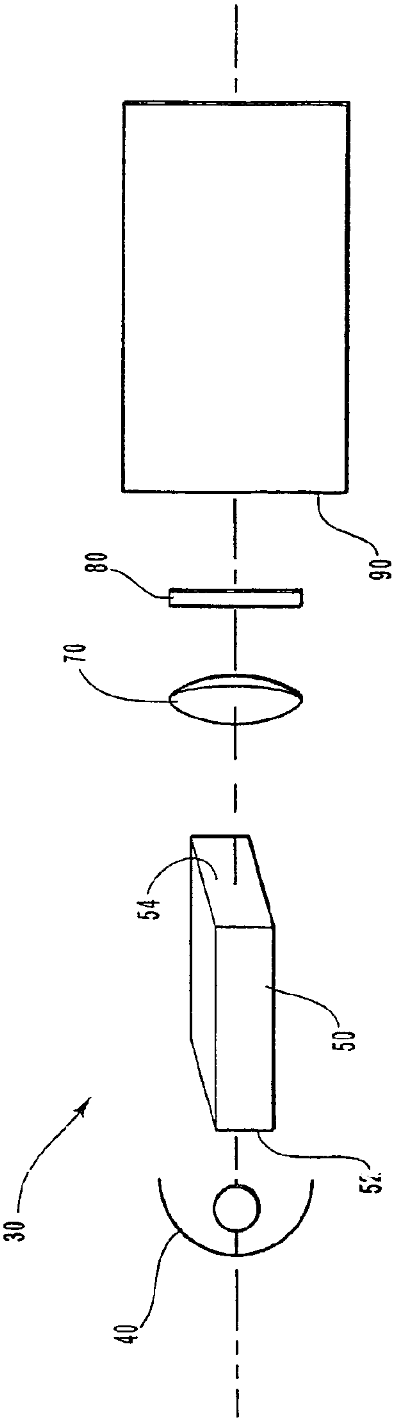
FIG. 4A is a schematic of the elements of the text projector of an embodiment of the present invention with an integrator tunnel
Figure 4B:
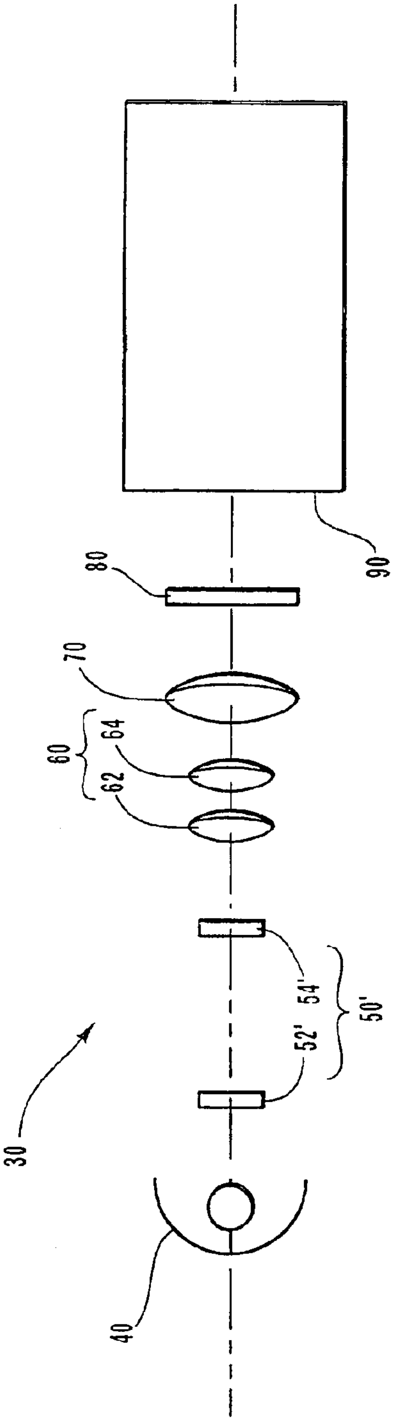
FIG. 4B is a schematic of the elements of the text projector of an embodiment of the present invention with a pair of fly eye panels.

FIGS. 4A and 4B are schematic views of the elements required for text projector 30 of two different embodiments of a projection system 10. Text projector 30 has a light source or lamp 40 adapted to project light to display text 132 and text box 130. Text projector 30 also has a light path modifier. In the embodiment shown in FIG. 4A, the light path modifier is an integrator tunnel 50 with an entry end 52 and an exit end 54. Integrator tunnel 50 is a tunnel with reflective walls as disclosed in U.S. Pat. No. 5,625,738, which is incorporated herein by reference.

Integrator tunnel 50 is positioned to receive light from light source 40 at entry end 52. Integrator tunnel 50 redistributes light from light source 40 so that, at exit end 54, the light is uniformly distributed in a shape matching the that of text box 130. In the embodiment shown in FIG. 4B, the light path modifier is a pair of fly eye panels 50', each of which corresponds to an array of small lenses, with a first fly eye panel 52' and a second fly eye panel 54'.

Text projector 30 further includes a relay lens 70 positioned to receive light from light path modifier 50 or 50' and to transmit light to a display device 80. As shown in FIG. 4B, the text projector preferably includes a pair of condensing lenses 62, 64. A single condensing lens may also be used. Condensing lenses 62, 64 are positioned to direct and condense light from light path modifier 50 or 50' to relay lens 70. Condensing lenses 60 operate to condense light so that display device can be smaller, reducing the overall cost of text projector 30. In an alternative embodiment, the text projector has no condensing lenses and relay lens 70 operates both as a relay lens and a condensing lens, as shown in FIG. 4A.

Display device 80 receives light in the shape of text box 130 as it is to be projected on screen 100. Display device 80 may be transmissive or reflective. For example, display device 80 may be a transmissive LCD panel or a reflective array of mirrors. A projection lens 90 is positioned to receive light transmitted or reflected by display device 80. The focus of text 132 in text box 130 is determined by the position of projection lens 90 relative to display device 80. Projection lens 90 is also positioned to superimpose text box 130 onto image 120, forming composite image 110.

Figure 5A:
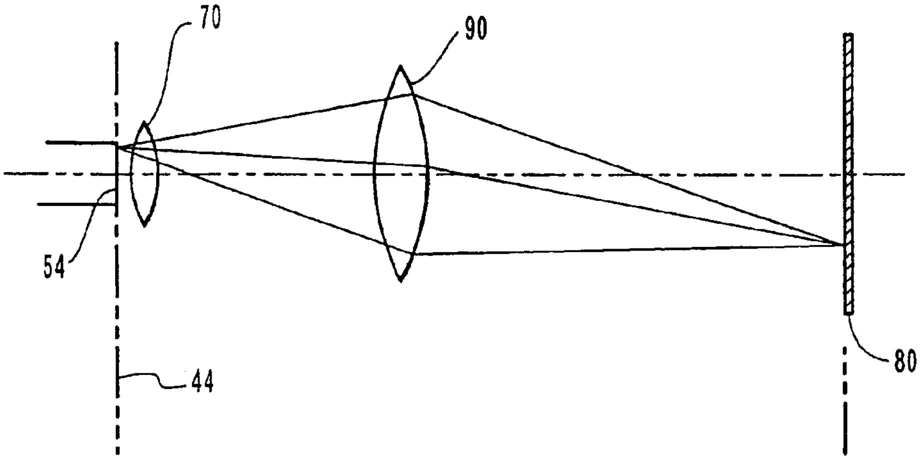
FIG. 5A is a schematic of the optical architecture and the relationship of the object plane and the display device, as a function of the placement of the light path modifier before the light path modifier is offset from the object plane.
Figure 5B:
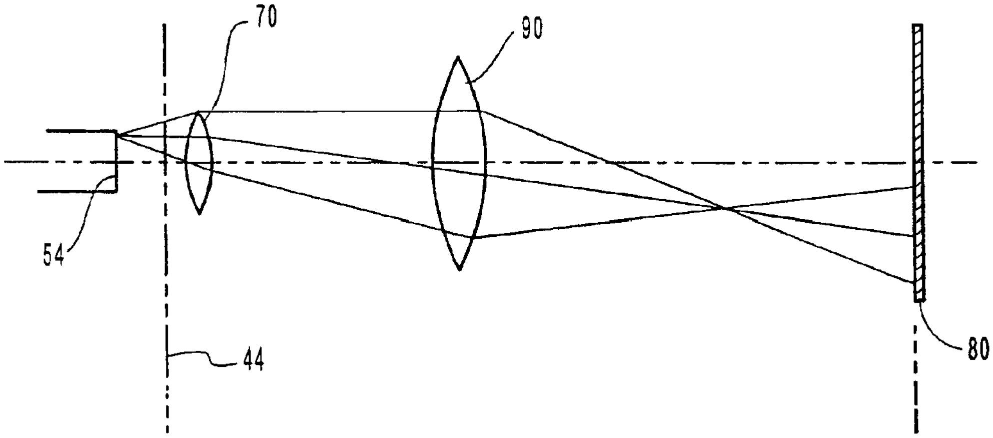
FIG. 5B is a schematic of the optical architecture and the relationship of the object plane and the display device, as a function of the placement of the light path modifier after the light path modifier is offset from the object plane.

As shown in FIGS. 5A and 5B, the position of relay lens 70 defines the position of an object plane 44. FIG. 5A shows exit end 54 of integrator tunnel 50 at object plane 44. In similar projectors that utilize fly eye panels, second fly eye panel 54' is at object plane 44. Text projector 30, configured as shown in FIG. 5A with exit end 54 or second fly eye panel 54' at object plane 44, projects a sharply defined image, with a border that abruptly transitions from image 120.

FIG. 5B shows an embodiment of the present invention with an integrator tunnel 50 as the light path modifier. Exit end 54 is sufficiently offset from object plane 44 and away from relay lens 70 such that the light from light source 40 is concentrated on the center of display device 80 and increasingly diffuse as the light approaches the edges of display device 80. The same effect may be achieved by offsetting exit end 54 from object plane 44 towards relay lens 70. The decrease in light concentration from the center of text box 130 to borders 134 of text box 130 minimizes the contrast between text box 130 and image 120. Stated otherwise, exit end 54 of integrator tunnel 50 is sufficiently offset from object plane 44 to enable image 120 to be at least partially visible through text box 130 at fade out transition region 136. Borders 134 of text box 130 projected by text projector as shown in FIG. 5B blend into image 120 along fade out transition region 136. Such a gradual transition causes less visual disruption to composite image 110 while still enabling text 132 to be completely legible. Similarly, in embodiments containing fly eye panels, front fly eye panel 54 is offset from object plane 44 as described above for exit end 54.

There are several steps involved in a method for projecting composite image 110 that minimizes the contrast at the transition from text box 130 around text 132 to image 120. After obtaining image projector 20 and obtaining text projector 30 with optical elements adapted to project text 132 in a text box 130, as described above, the optical elements are modified. More particularly the optical elements of text projector 30 are adjusted so that exit end 54 or front fly eye panel 54 is offset from object plane 44 away from relay lens 70 from exit end 54 or front fly eye panel 54. Alternatively, exit end 54 or front fly eye panel 54 may be offset toward object plane 44 toward relay lens 70.

As described above in connection with FIGS. 4A and 4B, adjusting the optical elements involves identifying the position of object plane 44 as defined by the position of relay lens 70 and positioning light path modifier 50, 51' relative to object plane 44 so that the light path modifier 50, 50' is offset from object plane 44. The light path modifier 50, 50' is offset from object plane 44 away from relay lens 70 sufficiently to diffuse light at borders 134 and concentrate light towards text 132 in text box 130 and to display device 80, thereby decreasing the sharpness of borders 134 so that contrast between text box 130 and image 120 is diminished. As discussed above, a similar effect is achieved by offsetting light path modifier 50 from object plane 44 toward relay lens 70.

It will be obvious to those having skill in the art that many changes may be made to the details of the above-described embodiments of this invention without departing from the underlying principles thereof. The scope of the present invention should, therefore, be determined only by the following claims.

What is claimed is:

1. A projection method comprising:

projecting an image; and projecting a text box with text on top of the image through a light path modifier offset from an object plane defined by a relay lens, with the text box having diffused borders.

2. The projection method of claim 1, wherein said projecting of the text box comprises modifying light projected by a light source, employing the light path modifier;

providing the modified light to a display device through the relay lens; and further providing the modified light from the display device to a projection lens.

3. The projection method of claim 2, further comprising modifying the light projected by the light source employing an integrator tunnel with reflective walls.

4. The projection method of claim 2, comprising modifying the light projected by the light source employing a pair of fly eye panels.

5. A system, comprising:

an image projector;

a text projector synchronized with the image projector, the text projector further comprises:

a relay lens defining an object plane;

a light path modifier positioned sufficiently offset from the object plane, and a display device displaying a projected image through the light path modifier and relay lens.

6. The system of claim 5, further comprising a light source.

* * * * *